United States Patent [19]
Carré et al.

[11] 4,117,769
[45] Oct. 3, 1978

[54] VACUUM BOOSTER

[75] Inventors: Jean-Jacques Carré, Montreuil; Roland Levrai, Stains, both of France

[73] Assignee: The Bendix Corporation, Southfield, Mich.

[21] Appl. No.: 747,459

[22] Filed: Dec. 3, 1976

[30] Foreign Application Priority Data

Dec. 10, 1975 [FR] France .............................. 75 37751

[51] Int. Cl.$^2$ .......................... F01B 7/00; F15B 9/10; F01B 19/00; F16J 3/04
[52] U.S. Cl. .............................. 91/170 R; 91/369 A; 92/42; 92/48; 92/63
[58] Field of Search ..................... 91/6, 376 R, 369 A, 91/369 B, 411 R, 170 R; 92/63, 48, 42, 34

[56] References Cited
U.S. PATENT DOCUMENTS 3,780,620 12/1973 Gardner ..................................... 91/6

Primary Examiner—Paul E. Maslousky
Attorney, Agent, or Firm—Leo H. McCormick, Jr.; Ken C. Decker

[57] ABSTRACT

A servomotor for power actuation of a mechanical or hydraulic control, for example brake master cylinders for motor vehicles, is disclosed. The servomotor includes a housing in which a power piston separates a low pressure chamber from a high pressure chamber. The power piston being movable from an idle position in response to a pressure difference between the chambers. The pressure difference being controlled by a valve associated with an inlet control member. An auxiliary power member is located in the high pressure chamber. The auxiliary power member has a pressure compartment connectible to an external pressure source. The auxiliary power member is adapted to move the power piston from its idle position irrespective of the establishment of the pressure difference, to permit the servomotor to be used in an automatic or emergency service brake system.

6 Claims, 1 Drawing Figure

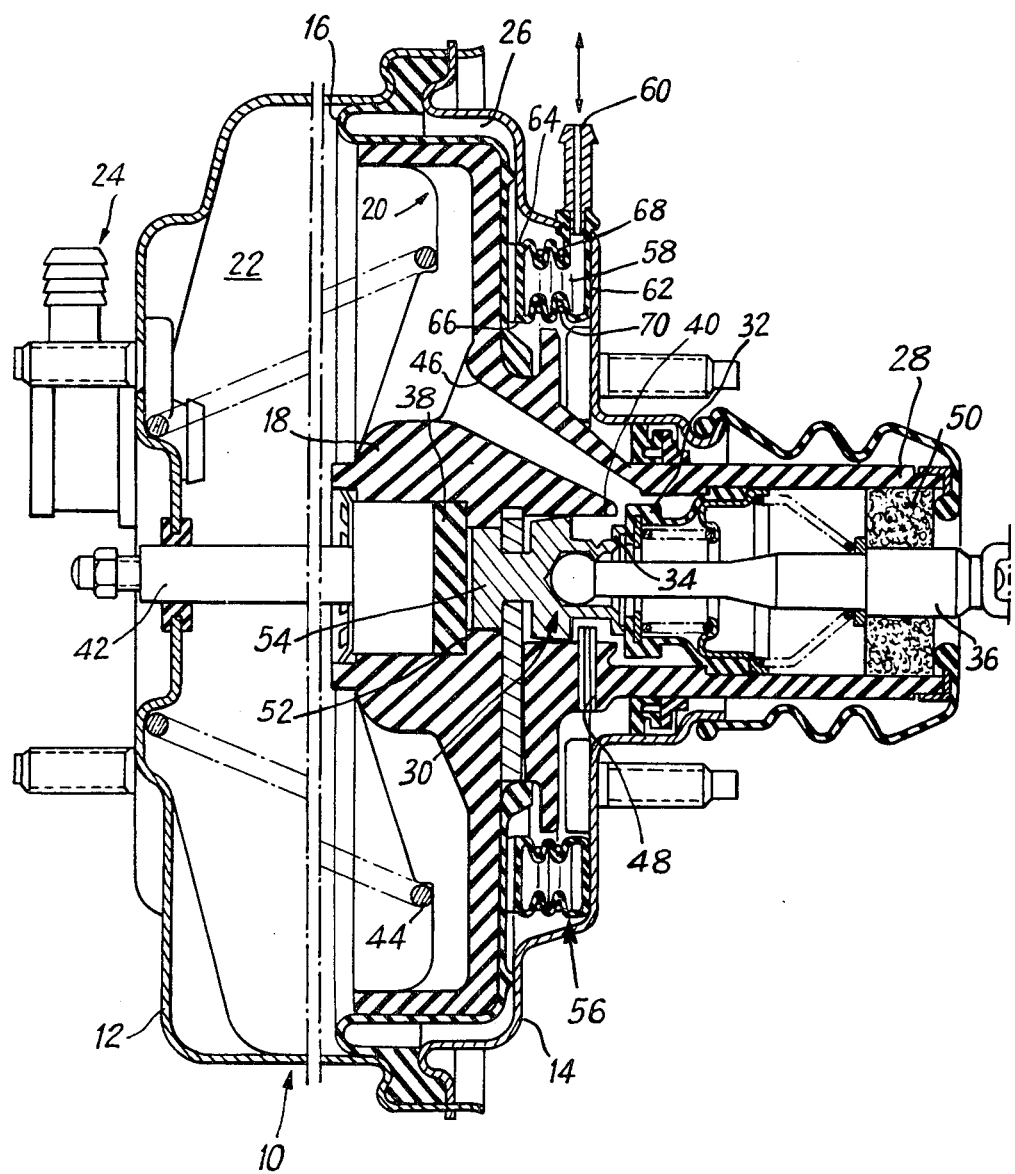

VACUUM BOOSTER

BACKGROUND OF THE INVENTION

Servomotors for power actuation are known which comprise a housing in which a power piston separates a low pressure chamber from a high pressure chamber. The power piston being movable from an idle position in response to an input force to establish a pressure difference between the two chambers. The pressure difference is controlled by movement of the control valve associated with an inlet control member.

Servomotors of this type are associated with many mechanical or hydraulic controls, such as master cylinders for motor vehicles. Such servomotors are operated by movement of a push rod associated with a brake pedal located in a vehicle. In addition to such power actuated brake systems, most vehicles have emergency brake systems which are independently operated by the operator.

SUMMARY OF THE INVENTION

To reduce expensive duplication of certain elements of the main and emergency brake systems, this invention proposes an improved servomotor which can be operated from an external control independently of the control valve associated with the servomotor. At least one auxiliary power member is provided in the high pressure chamber of the servomotor. The auxiliary power member has a pressure compartment connectible to an external pressure source and moves the power piston from its idle position independently of the establishment of a pressure difference thereacross.

BRIEF DESCRIPTION OF THE DRAWING

The invention will now be described with reference to the accompanying drawing, in which the single FIGURE represents a power actuation servomotor embodying the invention, illustrated in section.

DETAILED DESCRIPTION OF THE INVENTION

The power actuation servomotor shown in the FIGURE is of the pneumatic vacuum type. It comprises a housing 10 formed of two shell sections 12, 14 attached at the periphery and gripping the peripheral portion of a flexible diaphragm 16. The diaphragm 16 cooperates with a rigid plate 18 to form a power piston assembly 20. The power piston 20 separates the housing into two chambers, a low pressure chamber 22, permanently connected to a vacuum source by a non return valve 24, and a high pressure chamber 26. The plate 18 has a tubular portion 28 projecting out of the housing. This portion 28 retains a control valve device 30 of the three-way type.

The control valve 30 has an annular valve member 32 and seat 40. The valve member 32 cooperates alternately with a movable seat 34 attached to an inlet control member 36 and a rubber reaction disc device 38. The seat 40 which is fixed relative to the power piston 20. One side of the reaction disc 38 is in contact with one end of a pushrod 42, which projects from the housing 10. Push rod 42 operate an external control (not shown) such as, for example, a brake master cylinder in a motor vehicle.

A spring 44 located in the housing 10 urges the power piston 20 toward its idle position, against the shell section 14. When the servomotor is in the idle position, as illustrated in the drawing the valve member 32 is clear of the seat 40 and allows the two chambers 22, 26 to communicate by way of various passages 46, 48 in the rigid plate 18. However, the valve member 32 is in fluid-tight contact with the seat 34, and therefore prevents communication between the atmosphere and the high pressure chamber 26.

The vacuum type servomotor 10 hereinbefore described is entirely conventional. The servomotor 10 is operated when the driver of the vehicle applies an input force to the brake pedal. The rod 36 is moved to the left, in the FIGURE, by the input force so that the annular valve member 32 engages the seat 40 to disconnect the low pressure chamber 22 from the high pressure chamber 26, and clears the seat 34 so that air from the atmosphere can pass through a filter 50, the central portion of the valve member 32 and enter the high pressure chamber 26 through the passage 48. With air in chamber 26 and vacuum in chamber 22 a pressure difference is created between the two chambers. The pressure differential causes power piston 20 to move, to the left in the FIGURE and, due to the presence of a shoulder 52 in the rigid plate 18, causes the outlet rod 42 to move, also to the left in the FIGURE. The reaction to the movement of outlet rod 42 is transmitted from the outlet rod 42 to the inlet rod 36 by way of the disc 38, which acts on a projection 54 attached to the valve member 32. To conclude the control valve device 30 is of the follower type, that is, the movements of the various moving parts of the control valve are carried out relative to the power piston, and more precisely relative to the rigid plate 18.

As already stated, it may be an advantage to be able to operate the master cylinder independently of actuation of the control rod 36 by the driver, for example in the case of automatic braking. In accordance with the invention, the high pressure chamber 26 contains an auxiliary power member 56 comprising a pressure compartment 58 connectible to an external pressure source by an orifice 60. According to the requirements of the user of the vehicle, the compartment 58 is connected to the external source by an appropriate control device (not shown) such as an automatically controlled solenoid valve.

In the embodiment of the invention described, the auxiliary power member 56 is an annular enclosure situated between a wall of the housing 10 and the power piston 20 and coaxial with the latter, the enclosure being deformable in the direction of movement of the power piston 20. More particularly, the enclosure 56 comprises an elastomeric diaphragm of the type having a bellows of which the ends 62, 64 are flat so as to bear suitably on the wall of the shell section 14 and on the rigid plate. To allow fluid to flow freely into the high pressure chamber 26 the end 64 contains various radial grooves 66. The elastomeric diaphragm is supported by a fitting enabling it to extend in the direction of movement of the power piston 20 and restricting deformation of the bellows in the other directions. Possible types of fitting for an annular diaphragm include a pair of large diameter coil springs (not shown), one outside and the other inside, or a double series of rings placed in the folds of the bellows (outer rings 68 and inner rings 70) as shown in the FIGURE.

MODE OF OPERATION OF THE INVENTION

The servomotor embodying the invention operates as follows. If the brake pedal is not depressed by the driver of the vehicle, the high pressure chamber 26 communicates with the vacuum source. In the event of automatic braking, when the compartment 58 is connected to the external pressure source, for example the atmosphere, the diaphragm 56 deforms primarily in the direction of movement of the piston, so as to move the latter to the left in the FIGURE and so as to operate the master cylinder associated with the outlet rod 42. If the power actuating servomotor is subsequently operated by means of the pedal 36, the introduction of air from the atmosphere into the high pressure chamber 26 causes the bellows diaphragm 56 to retract.

The servomotor 10 embodying the invention can be used whenever it is desirable to have automatic braking without having to depress the brake pedal of the vehicle. The automatic braking can be limited as desired by the vehicle designer by limiting the stroke of the bellows diaphragm 56. It is also possible to use a servomotor of this kind in association with a compressed air compressor or a hydraulic pump and so to supply fluid to the pressure compartment 58 at a high pressure as a substitute for conventional vacuum power actuation after the pressure difference between the two chambers has reached its maximum.

Obviously, the invention is not restricted to a pneumatic servomotor of the vacuum type nor to its application to a brake-assisting servomotor for a vehicle. Also, the invention is not limited to the annular type of bellows diaphragm, but may equally well be embodied, in a variant by a series of small cylindrical bellows equipped with an external fitting and equispaced round a ring coaxial with the piston, their pressure compartments being connected to a supply orifice 60. Lastly, the auxiliary power members may, in another variant of the invention, take the form of an ordinary hydraulic or pneumatic control of the piston and cylinder type.

We claim:

1. A servomotor for providing an output force comprising:
    a housing having a cavity therein:
    a piston for separating said cavity into a first pressure chamber and a second pressure chamber;
    an inlet control member responsive to an operator input for moving a control valve for controlling the communication of a fluid to said first pressure chamber, said fluid in the first pressure chamber developing a pressure differential between said first chamber and said second chamber, said pressure differential moving said piston from an idle position toward said second pressure chamber to produce a first output force; and
    expandable means defining at least an auxillary chamber within said first chamber, said auxillary chamber being connected to an external pressure source, said expandable means being responsive to said external pressure source for moving into engagement with said piston and thereafter moving said piston from the idle position toward said second pressure chamber to develop a second output force independently of the operation of said inlet control member by the operator input.

2. A servomotor for providing an output force as claimed in claim 1, wherein said auxillary chamber is an annular enclosure located between a wall of the housing and said piston, said annular enclosure being coaxial with said piston, said annular enclosure being deformable toward said second chamber.

3. A servomotor for providing an output force as claimed in claim 1, wherein said auxillary chamber is defined by an elastomeric diaphragm of the type having a bellows with substantially flat ends which are located between the housing and said piston.

4. A servomotor for providing an output force as claimed in claim 3, wherein the bellows-type diaphragm has a fitting enabling it to extend toward said second chamber but restricting deformation of said diaphragm in other directions.

5. A servomotor for providing an output force as claimed in claim 4, wherein the fitting includes rigid rings located within folds of the bellows.

6. A servomotor for providing an output force as claimed in claim 1, said servomotor being of the pneumatic vacuum type in which said second pressure chamber is permanently connected to a vacuum source and said first pressure chamber is connected alternately by way of the control valve to said vacuum source and to the atmosphere, and wherein the external pressure source is also the atmosphere.

* * * * *